United States Patent Office 3,489,793
Patented Jan. 13, 1970

3,489,793
NEW BENZAMIDO BUTYRIC ACID DERIVATIVES
Aldo Bertelli, Milan, Italy, assignor to Francia Farmaceutici S.r.l., Milan, Italy, an Italian body corporate
No Drawing. Filed May 16, 1966, Ser. No. 550,128
Int. Cl. C07c *101/74, 103/28;* A61k *27/00*
U.S. Cl. 260—471                           4 Claims

ABSTRACT OF THE DISCLOSURE

Gamma-(orthohydroxybenzamido)-butyric acid, its alkyl and benzyl esters and its amide are prepared by reacting an alkali metal salicylamide with a gamma-bromobutyric acid ester, and converting the ester to the acid or amide. The novel compounds exhibit anti-inflammatory, analgesic, antipyretic, and spasmolytic action, and may be administered therapeutically either orally, or as suppositories, or topically.

An object of the present invention is to provide new compounds having the following formula:

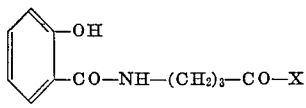
                                (I)

in which X is a radical selected from the group consisting of methoxy, ethoxy, n-propoxy, isopropoxy, n-butoxy, sec-butoxy, isobutoxy, benzyloxy, hydroxy and amino.

Among the compounds having the general Formula I there can be mentioned in particular ethyl γ-(orthohydroxy-benzamido) butyrate, γ-(orthohydroxy-benzamido) butyric acid and γ-(orthohydroxy-benzamido) butyramide.

Another object of the invention is to provide a process for preparing compounds of Formula I comprising reacting an alkali metal salicylamide with γ-bromobutyric acid having the formula Br—$(CH_2)_3$—COOR in which R is a radical selected from the group consisting of methyl, ethyl, n-propyl, n-butyl, sec-butyl, isobutyl and benzyl thereby producing a γ-(orthohydroxy-benzamido) butyric acid ester of Formula I in which X=OR and, if desired, converting the ester of Formula I thus obtained into a compound of Formula I in which X is a radical selected from the group consisting of OH and $NH_2$.

To prepare alkali metal salicylamide, the salicylamide in solution is reacted in an organic solvent such as acetone with the corresponding alkali metal hydroxide.

The compounds of the general Formula I can be prepared in accordance with the following general procedure:

1 mole of salicylamide is dissolved in acetone, and a 50% solution of 1 mole of NaOH in water is added drop by drop, while stirring. The precipitate is left in the refrigerator and filtered rapidly. The product obtained is dissolved in $CH_3OH$ and 1 mole of suitably esterified γ-bromobutyric acid is added. The mixture is stirred and thereafter heated several times. It is concentrated and a small amount of aqueous HCl is added until a pH of 6 is obtained, and the product is then extracted with chloroform. The solution is dried on $Na_2SO_4$ and concentrated and the ester of Formula I which is precipitated with diethyl ether (1 vol.) and petroleum ether (2 vol.), is thereafter crystallized in alcohol. If desired, the amide of Formula I is obtained by the action of ammonia on the ester. By hydrolysis of the ester with diluted $H_2SO_4$ while boiling, the acid of Formula I is obtained. This process is illustrated by the following reactions:

(a) Formation of the salicylamide:

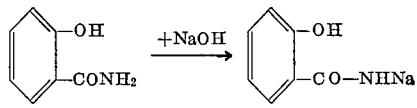

(b) Formation of the ester of Formula I:

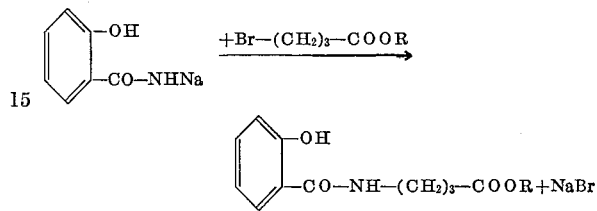

(c) Hydrolysis of the ester giving the acid:

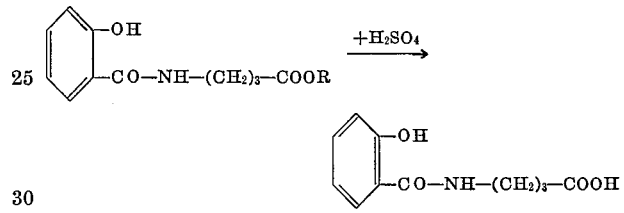

(d) Action of the ammonia on the esters:

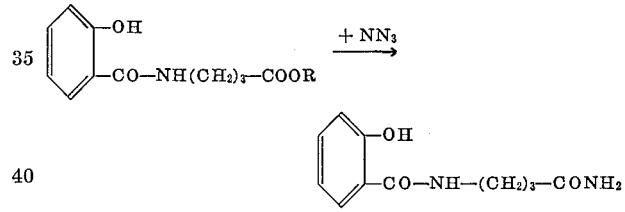

Two detailed examples of the preparation of two of the compounds of Formula I and a few of their physical properties and characteristics will now be given. It must be understood that the invention is not intended to be limited by these examples.

Example I.—Ethyl γ-(orthohydroxy-benzamide) butyrate

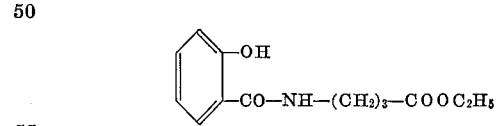

35 g. of salicylamide are dissolved in 500 ml. of acetone and a solution of 11 g. of NaOH in 15 ml. of water is added drop by drop while stirring. The precipitate is left overnight in the refrigerator. The product is then rapidly filtered (the product is hygroscopic). The residue, which is dried on $H_2SO_4$, weighs 38 g. The product is dissolved in 70 ml. of absolute $CH_3OH$, 46 g. of ethyl γ-bromobutyrate are added drop by drop while stirring. The mixture is stirred for 30 minutes and the temperature of the bath is then slowly raised to reflux temperature. The product is heated for 4 hours and concentrated until a syrup is obtained. HCl is added until a pH of 6 is reached and the product is extracted 3 times with 50 ml. of chloroform. The product is concentrated under low pressure until a syrup is obtained. An equal volume of diethyl ether and 2 volumes of petroleum ether are added. The precipitate is crystallized in the alcohol-water mixture and has a melting point of 90° C. and forms needles.

Example II.—γ-(orthohydroxy-benzamido) butyric acid

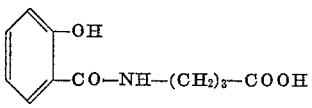

Ethyl γ-(orthohydroxy-benzamido) butyrate is boiled with 10% $H_2SO_4$ for several minutes. After cooling, the mixture is filtered and the residue is washed until neutrality and dissolved into a saturated solution with $NaHCO_3$. The product is filtered and the filtered product is acidified with $CH_3COOH$ N. The precipitate obtained is filtered and washed with iced water. The product is recrystallized in boiling alcohol. Melting point: 174–175° C.

The compounds of Formula I have anti-inflammatory, analgesic and spasmolytic properties of interest in human therapeutics.

By way of an example, by which the invention is not intended to be limited, there will now be given the results of a toxicological and pharmacological study of γ-(orthohydroxy-benzamido) butyric acid, which is a compound perfectly representing all the compounds of Formula I.

(I) TOXICOLOGICAL STUDY

The $LD_{50}$ of γ-(orthohydroxy-benzamido) butyric acid, studied by the administration by the intraperitoneal route in the mouse, is 0.825 g. An administration for 30 consecutive days, both in the rate and the mouse, of 50 mg./kg. by the intramuscular route or 150 mg./kg. by the oral route was well tolerated. No parenchymal alteration of the organs or of the blood formula were observed at the end of the treatment.

(II) PHARMACOLOGICAL STUDY (1) Spasmolytic action

Both "in vitro" on the intestine of the Guinea pig and "in vivo" on the intestine of the rabbit, γ-(orthohydroxy-benzamido) butyric acid prevents the contraction created by acetylcholine or histamine. It also has an inhibitory action on the intestinal peristalsis activated by the injection of carbaminoyl-choline.

(2) Anti-inflammatory action

The molecule has an inhibitory action on the edema following the administration, according to the various tests, of albumine by the general route, dextrane and serotonin by the local route in the paws of the rat.

(3) Analgesic action

γ - (orthohydroxy-benzamido)butyric acid, tested by means of the hot plate or the pinching of the tail of the rat, has an analgesic action comparable to that of acetylsalicylic acid.

(4) Antipyretic action

Hyperthermic reactions, created in the rabbit or in the rat by the administration of typhus vaccine or yeast, are inhibited by the prior administration of γ-(orthohydroxy-benzamido) butyric acid.

It is clear from the experiments described hereinbefore that the new compounds according to the invention have a low toxicity and an obvious anti-inflammatory, spasmolytic, analgesic and antipyretic action, in certain cases much greater than the action of salicylic acid or acetylsalicylic acid.

They are of utility in human therapeutics for their anti-inflammatory, spasmolytic and analgesic properties in the treatment of disorders of spasmodic, exudative and algetic nature.

For this purpose, they are incorporated in a therapeutic composition in which the active compound is associated with the usual vehicles or excipients.

This therapeutic composition can be administered by the oral, rectal or topical routes.

As concerns these various modes of administration, it is put into the form of tablets, suppositories or ointment, in which the active principle is associated with the vehicles and excipients appropriate to these pharmaceutical forms.

When the therapeutic composition is in the form of unit doses, each dose contains 0.10 g.–1 kg. of active principle.

Some pharmaceutical prescriptions of the composition according to the invention will now be given. It must be understood that the invention is not intended to be limited thereby.

(a) Tablets containing 0.25 g. of active principle in an excipient for tablets.

(b) Suppositories containing 0.5 g. of active principle in a support or base for suppositories.

(c) Ointment containing 10% active principle in a support or base suitable for this type of pharmaceutical preparation.

The doses which may be administered in 24 hours vary in accordance with the contemplated application.

The mean dose administered is 1–2 tablets, 2 to 3 times daily for oral administration; 1–2 suppositories once or twice daily for administration by the rectal route, and 3–4 daily applications of ointment.

Having now described my invention what I claim as new and desire to secure by Letters Patent is:

1. A compound having the formula:

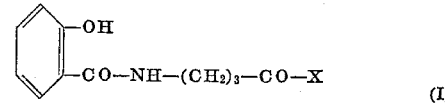

in which X is a radical selected from the group consisting of methoxy, ethoxy, n-propoxy, isopropoxy, n-butoxy, sec-butoxy, isobutoxy, benzyloxy, hydroxy and amino.

2. Ethyl γ-(orthohydroxy-benzamido)-butyrate.
3. γ-(orthohydroxy-benzamido)-butyric acid.
4. γ-(orthohydroxy-benzamido)-butyramide.

References Cited

Arch. Int. Pharmacopyn; (1963) vol. 145, No. 1–2 by Lightowler et al. (pp. 233–242).

Chemical Abstracts, vol. 58 (1964) by Satoda et al. (pp. 471 F to 472 A).

LORRAINE A. WEINBERGER, Primary Examiner

L. ARNOLD THAXTON, Assistant Examiner

U.S. Cl. X.R.

260—519, 559; 424—309, 319, 324